United States Patent [19]

Rutty

[11] 4,153,996

[45] May 15, 1979

[54] COILABLE RULE WITH COMBINATION BLADE LOCK AND SHOCK ABSORBER MECHANISM

[75] Inventor: Edward C. Rutty, Portland, Conn.

[73] Assignee: The Stanley Works, New Britain, Conn.

[21] Appl. No.: 860,449

[22] Filed: Dec. 14, 1977

[51] Int. Cl.² ................. G01B 3/08; B65H 75/16; B65H 75/24

[52] U.S. Cl. ................. 33/138; 242/84.8; 242/107.3

[58] Field of Search ............ 33/138; 242/84.8, 107.3

[56] References Cited

U.S. PATENT DOCUMENTS

| | | | |
|---|---|---|---|
| 2,575,354 | 11/1951 | Mills | 242/84.8 |
| 3,164,907 | 1/1963 | Quenot | 33/138 |
| 3,521,831 | 7/1970 | Schmidt | 242/84.8 |
| 3,905,114 | 9/1975 | Rutty | 33/138 |

Primary Examiner—Steven L. Stephan
Attorney, Agent, or Firm—Prutzman, Kalb, Chilton & Alix

[57] ABSTRACT

A coilable rule is provided with a combination blade lock and shock absorber mechanism to lock its measuring blade in an extended position and absorb the shock of impact upon retraction of the blade. A lever is attached to the rule housing by a slidable pivot connection which allows the lever to be manually pivoted into and out of engagement with the measuring blade and also permits longitudinal movement of the lever relative to the housing. The lever is normally biased against the measuring blade by a bias spring to lock the blade in any extended position. When the blade is released and retracted under the action of its recoil spring, a blade pull-out hook contacts and moves the lever longitudinally against the bias spring to slide the lever relative to the housing and absorb the shock of impact.

9 Claims, 3 Drawing Figures

COILABLE RULE WITH COMBINATION BLADE LOCK AND SHOCK ABSORBER MECHANISM

The present invention relates to coilable rules and, more particularly, to a coilable rule provided with a combination blade lock and shock absorber mechanism to permit its measuring blade to be locked in an extended position and to absorb the shock of impact when the blade is returned to its retracted position. The invention constitutes an improvement in the type of coilable rule disclosed and claimed in U.S. Pat. No. 3,164,907, issued Jan. 12, 1965.

In coilable rules, it is highly desirable to provide a locking device to allow the measuring blade to be locked in place when the blade is extended for convenience in making measurements. Also, to avoid undue stress and wear on the rule components, it is desirable to provide a shock absorbing mechanism to cushion the shock of impact when the measuring blade is retracted into its housing. Typically, the coilable rules of the prior art have employed separate devices to provide the desired features of a blade lock and shock absorber. However, the use of separate mechanisms has required additional components to achieve both features in a single coilable rule.

An object of the present invention is to provide a combination blade lock and shock absorber mechanism for a coilable rule.

Another object of the invention is to achieve a combination blade lock and shock absorber mechanism which automatically locks the measuring blade in any extended position and cushions the shock of impact upon retraction of the blade.

An additional object of the invention is to provide a coilable rule incorporating blade lock and shock absorber features which is simple in construction and operation.

The present invention provides a combination blade lock and shock absorber mechanism for a conventional coilable rule of the type having a housing, a retractable measuring blade with a free end extending through an opening in the housing, and a hook at the free end of the blade. The blade lock and shock absorber mechanism is embodied as a lever mounted on the housing and located adjacent to the opening in the housing for engagement with the hook to prevent complete retraction of the blade into the housing, pivot means for pivotally connecting the lever to the housing to allow the lever to be manually pivoted into and out of engagement with the blade and adapted to permit longitudinal movement of the lever relative to the housing, and spring bias means for normally biasing the lever against the blade to prevent movement of the blade and for absorbing the shock of impact when the hook contacts and moves the lever longitudinally upon retraction of the blade into the housing.

In a preferred embodiment, the lever extends longitudinally across an open bottom end of the housing. The front end of the lever is located in the path of the hook and cooperates with the housing to define a mouth for passing the blade. A pivot connection allows the lever to be moved into and out of engagement with the blade by manual pressure applied to its rear end. The pivot connection is slidable to permit a predetermined amount of translational movement of the lever relative to the housing. Spring bias means urges the lever about the pivot means to normally hold its front end in engagement with the blade to prevent movement of the blade and also allows the lever to slide relative to the housing to absorb the shock of impact when the hook moves into contact with the lever upon retraction of the blade into the housing.

Preferably, the slidable pivot connection comprises a pair of axial aligned pivot shafts extending transversely from opposite sides of the lever and a pair of journal bearings mounted on the housing for receiving the pivot shafts. The journal bearings are elongated to permit a limited amount of translational movement of the pivot shafts and the lever relative to the housing. A coil spring is anchored to the housing and engageable with the rear end of the lever to bias the front end angularly against the blade and forwardly toward the hook. In the preferred embodiment, the journal bearings are oval-shaped in configuration and orientated at a downwardly and forwardly inclined angle relative to the lever. Similarly, the coil spring is orientated at a downwardly inclined angle toward the front end of the lever.

The slidable pivot connection of the lever to the housing permits the blade lock and shock absorber features to be achieved by a single mechanism. The inclined orientation of the elongated journal bearings and coil spring of the preferred embodiment achieves an uncomplicated arrangement which readily achieves both desirable features.

The accompanying drawing illustrates a preferred embodiment of the invention and, together with the description, serves to explain the principles and operation of the invention.

Figure 1:
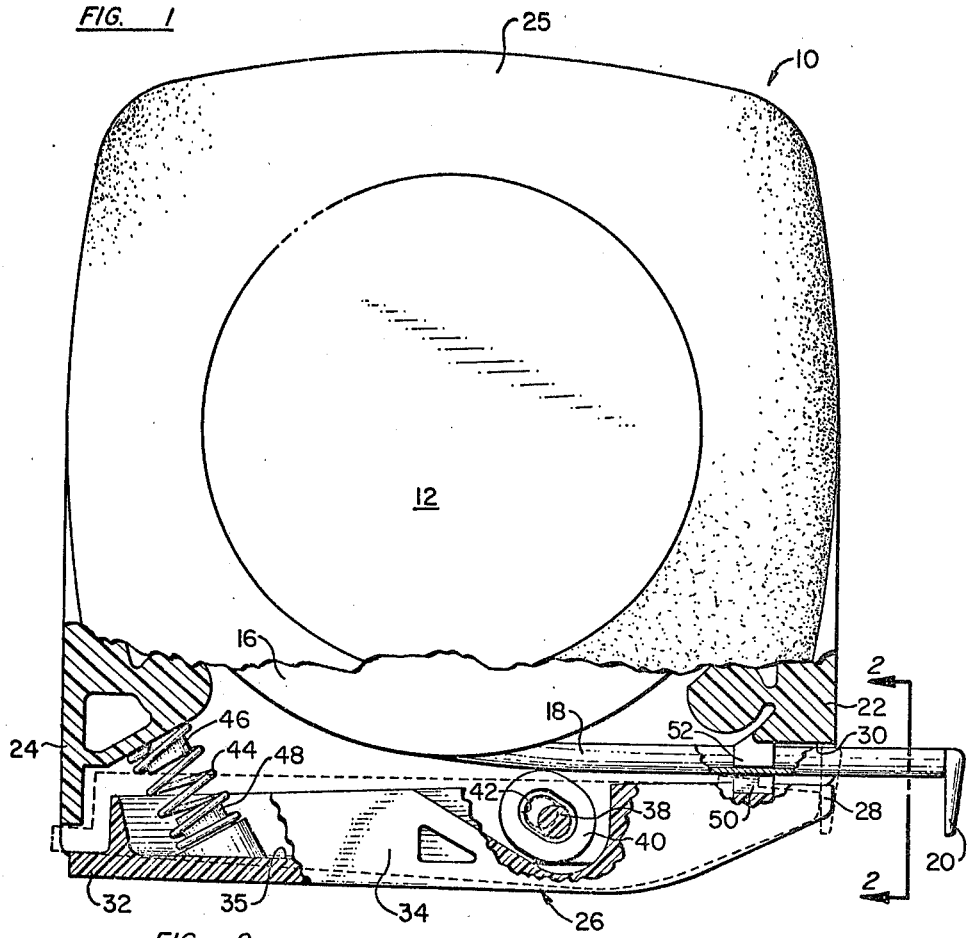
FIG. 1 is a partially cut-away side view of a coilable rule including a lever which provides the combination blade lock and shock absorber mechanism of the present invention.
Figure 2:
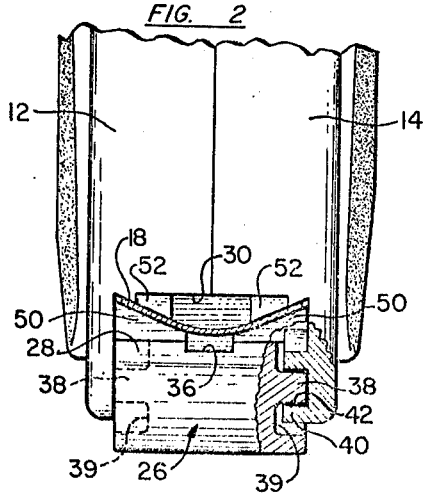
FIG. 2 is a front, fragmentary view of the blade lock and shock absorber lever taken along line 2—2 of FIG. 1.

Referring to FIGS. 1 and 2, a coilable rule generally 10, includes a housing consisting of a pair of mating sections 12 and 14 which fit together to define a hollow interior for receiving a spool 16 supporting a coilable measuring blade 18. The inner end of blade 18 is connected to a recoil spring (not shown) to retract the blade into the housing. A free end of blade 18 extends outwardly from the housing and a hook 20 is provided at its free end to allow the blade to be pulled out and to prevent complete retraction of the blade into the housing. Hook 20 may be secured to blade 18 by one or more rivets (not shown).

As shown in FIG. 1, the coilable rule housing of the preferred embodiment is provided with an open bottom end. Each housing section includes a front wall 22, a rear wall 24 and a side wall 25.

The blade lock and shock absorber mechanism of the present invention is embodied as a lever, generally 26, extending across the open bottom end of the housing. In effect, lever 26 constitutes the bottom wall of the coilable rule housing. As shown in FIG. 1, the lever has a front end 28 located in the path of hook 20. Front end 28 cooperates with front wall 22 of the housing to define a mouth 30 for passing blade 18. Lever 26 extends longitudinally along the bottom of the housing and its rear end 32 is located adjacent to rear wall 24 of the housing.

Figure 3:
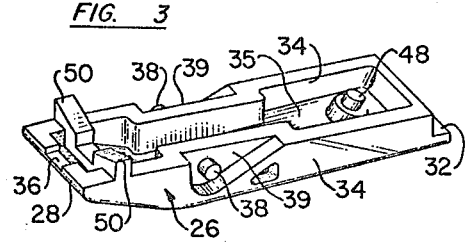
FIG. 3 is a perspective view of the lever of FIG. 1 removed from the coilable rule housing to illustrate the details of its construction.

Referring to FIG. 3, lever 26 is preferably constructed as a single, molded plastic unit. The lever includes a pair of upstanding side walls 34 and a generally flat bottom wall 35 which define a hollow interior space. Front end 28 of the lever includes a central notch 36 for receiving the rivets (not shown) used to secure hook 20 to measuring blade 18.

The blade lock and shock absorber mechanism includes pivot means for pivotally connecting the lever to the housing to allow its front end to be moved into and out of engagement with the blade by manual pressure at its rear end. In addition, the pivot means is slidable to permit a limited amount of translational movement of the lever relative to the housing. Referring to FIGS. 1 and 2, a pivot connection is embodied as a pair of axially aligned pivot shafts 38 extending transversely from opposite sides of lever 26. As shown in FIG. 3, each side wall 34 of the lever includes a recessed portion 39 on which its pivot shaft 38 is integrally formed. Pivot shafts 38 are received in a pair of journal bearings 40 integrally formed on the inner side walls of housing sections 12 and 14. The inwardly projecting journal bearings are received by recessed portions 39 of lever 26 when it is assembled with housing sections 12 and 14.

Preferably, the journal bearings are elongated to permit a limited amount of sliding movement of the pivot shafts and lever relative to the housing. As shown in FIG. 1, each journal bearing 40 is provided with an elongated opening 42 for receiving pivot shaft 38. Opening 42 is generally oval-shaped in configuration and orientated at an angle inclined downwardly toward front end 28 of lever 26. The elongated, inclined bearings permit lever 26 to slide or translate by a predetermined amount relative to the housing as shown in solid lines and phantom lines, respectively, in FIG. 1. As shown, the elongated openings 42 are inclined at an angle of about 30° relative to the path of travel of the blade through the mouth of the housing.

The blade lock and shock absorber mechanism also includes spring bias means for biasing the lever about the pivot means to normally hold its front end in engagement with the blade to prevent movement of the blade. As shown in FIG. 1, a coil spring 44 is anchored to a stud 46 projecting from rear wall 24 of the housing. The coil spring engages another stud 48 projecting upwardly and rearwardly from bottom wall 35 of lever 26 adjacent to its rear end 32. Coil spring 44 normally biases lever 26 into a locked position (shown in solid lines in FIG. 1) to clamp measuring blade 18 against movement. A pair of brake shoes 50 (FIGS. 1 and 2) are provided on top of lever 26 adjacent to its front end 28 to engage and hold the blade against another pair of brake shoes 52 extending downward from front wall 22 of the housing. As shown in FIG. 3, brake shoes 50 may be integrally formed on lever 26. The clamping force exerted on measuring blade 18 by the brake shoes under the bias of coil spring 44 is sufficient to hold the blade in any desired extended position.

The spring bias means allows lever 26 to slide relative to the housing to absorb the shock of impact when hook 20 moves into contact with the lever upon retraction of measuring blade 18 into the housing. As shown in FIG. 1, coil spring 44 is oriented at a downwardly and forwardly inclined angle to bias lever 26 in the direction of its front end 28. As shown, the axis of the spring 44 is about 60° relative to the path of travel of the blade through the mouth of the housing. This orientation of coil spring 44 tends to maintain lever 26 in its locked position (shown in solid lines in FIG. 1) to clamp measuring blade 18 against movement. However, when manual pressure is applied to rear end 32 of the lever to pivot its front end 28 and brake shoes 50 out of engagement with blade 18, the blade is unclamped and allowed to retract under the action of its recoil spring (not shown). At the termination of recoil, the hook 20 engages the front end 28 of lever 26, the lever is shifted backward against the bias of coil spring 44 into its retracted position (shown in phantom lines in FIG. 1). As a result, undue stress and wear on the blade, hook and housing are substantially eliminated.

The present invention is not limited to the specific details shown and described, and modifications may be made in the combination blade lock and shock absorber mechanism without departing from the principles of the invention.

What is claimed is:

1. In a coilable rule having a housing, a retractable measuring blade with a free end extending through an opening in the housing, and a hook at the free end of the blade, a combination blade lock and shock absorber, comprising:

a lever mounted on the housing and located adjacent to the opening therein for engagement with the hook to prevent complete retraction of the blade into the housing;

pivot means for pivotally connecting said lever to the housing to allow said lever to be manually pivoted into and out of engagement with the blade, said pivot means forming a lost motion connection to permit both pivotal and longitudinal movement of said lever relative to said housing; and spring bias means for normally biasing said lever angularly about said pivot means into engagement with the blade to prevent movement thereof and biasing said lever longitudinally toward said opening for absorbing the shock of impact when the hook engages the lever upon the termination of retraction of the blade into the housing.

2. The coilable rule of claim 1, wherein said pivot means comprises:

a pair of axially aligned pivot shafts extending transversely from opposite sides of said lever; and a pair of journal bearings mounted on the housing for receiving said pivot shafts, said journal bearings being elongated at an acute angle relative to the path of longitudinal movement of the blade during retraction to permit a limited amount of translation of said pivot shafts and said lever relative to housing.

3. The coilable rule of claim 2, wherein said spring bias means comprises:

a coil spring anchored to the housing and engageable said lever to bias said lever angularly about said pivot means and longitudinally toward the hook.

4. In a coilable rule having a housing provided with an open bottom end, a coilable measuring blade with a free end extending outwardly from the housing, a spring to retract the blade into the housing, and a hook at the free end of the blade to prevent complete retraction of the blade into the housing, a combination blade lock and shock absorber, comprising:

a lever extending longitudinally across the open bottom end of the housing and having a front end thereof located in the path of the hook and a rear end, said front end of said lever cooperating with the housing to define a mouth for passing the blade;
pivot means for pivotally connecting said lever to the housing to allow said front end to be moved into and out of engagement with the blade by manual pressure at said rear end thereof, said pivot means comprising a lost motion connection to permit a predetermined amount of forward translational movement of said lever relative to the housing; and
spring bias means for biasing said lever angularly about said pivot means to normally hold said front end in engagement with the blade to prevent movement of the blade and to bias said lever forwardly to absorb the shock of impact when the hook moves into contact with said lever upon retraction of the blade into the housing.

5. The coilable rule of claim 4, wherein said pivot means comprises:
a pair of axially aligned pivot shafts extending transversely from opposite sides of said lever; and
a pair of journal bearings mounted on the housing for receiving said pivot shafts, said journal bearings being elongated at an acute angle relative to the path of longitudinal movement of the blade during retraction to permit a limited amount of longitudinal movement of said pivot shafts and said lever relative to the housing.

6. The coilable rule of claim 5 wherein:
said journal bearings are oval-shaped in configuration and oriented at a downwardly inclined angle toward said front end of said lever.

7. The coilable rule of claim 6, wherein said spring bias means comprises:
a coil spring anchored to the housing and engageable with said rear end of said lever to bias said front end thereof angularly against the blade and forwardly toward the hook.

8. The coilable rule of claim 7, wherein:
said coil spring is oriented at a downwardly inclined angle toward said front and said lever.

9. The coilable rule of claim 7, wherein:
said journal bearings are inclined at an angle of about 30° relative to the path of travel of the blade through the mouth of the housing, and said coil spring is inclined at an angle of about 60° relative to the path of travel of the blade through the mouth of the housing.

* * * * *